United States Patent
Li et al.

(10) Patent No.: US 8,058,989 B2
(45) Date of Patent: *Nov. 15, 2011

(54) METHOD FOR OBTAINING DIRECTION OF TARGET LOCATION THROUGH A HANDSET

(75) Inventors: Chengjun Li, Shenzhen (CN); Jilin Li, Shenzhen (CN); Zhengwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,982

(22) Filed: Aug. 18, 2009

(65) Prior Publication Data

US 2009/0303038 A1 Dec. 10, 2009

Related U.S. Application Data

(63) Continuation of application No. 11/456,982, filed on Jul. 12, 2006, now Pat. No. 7,595,724, which is a continuation of application No. PCT/CN2005/000051, filed on Jan. 13, 2005.

(30) Foreign Application Priority Data

Jan. 17, 2004 (CN) .......................... 2004 1 0000964
Sep. 2, 2004 (CN) .......................... 2004 1 0073713

(51) Int. Cl.
*G08B 1/08* (2006.01)
(52) U.S. Cl. .................. 340/539.13; 340/539.1; 379/37
(58) Field of Classification Search .............. 340/539.13
See application file for complete search history.

(56) References Cited

U.S. PATENT DOCUMENTS 5,146,231 A 9/1992 Ghaem et al.
(Continued)

FOREIGN PATENT DOCUMENTS

CN 1223722 A 7/1999
(Continued)

OTHER PUBLICATIONS

Notice of Reasons for Rejection for Japanese Patent Application No. 2006-548080, dated Dec. 2, 2008, and English Abstract thereof.

(Continued)

*Primary Examiner* — Travis Hunnings
(74) *Attorney, Agent, or Firm* — Leydig, Voit & Mayer, Ltd.

(57) ABSTRACT

The present invention discloses a method for obtaining the direction of a target location through a handset, which includes: the handset obtains geographical information of a current location and that of the target location, determines a geographical meridian line of the current location and a angle of this geographical meridian line displayed on the screen of the handset; the handset determines the direction from the current location to the target location according to geographical information of the current location and that of the target location, determines an included angle between this direction and the geographical meridian line. According to the included angle and that of the geographical meridian line displayed on its screen, the handset determines the direction displayed on the screen of the handset from the current location to the target location, and displays the direction of the target location on the screen according to the displayed direction. The present invention solves the problem that existing handsets cannot provide the direction of the target location for the user. The user can confirm the direction of the target location through the handset.

13 Claims, 1 Drawing Sheet

U.S. PATENT DOCUMENTS

| | | | |
|---|---|---|---|
| 6,820,002 B2 * | 11/2004 | Terada | 701/207 |
| 6,978,206 B1 | 12/2005 | Pu et al. | |
| 6,978,209 B2 | 12/2005 | Nakahara et al. | |
| 7,595,724 B2 * | 9/2009 | Li et al. | 340/539.13 |
| 2002/0049064 A1 | 4/2002 | Banno | |
| 2002/0115450 A1 | 8/2002 | Muramatsu | |
| 2002/0198003 A1 * | 12/2002 | Klapman | 455/456 |
| 2003/0103002 A1 * | 6/2003 | Hasebe et al. | 342/357.08 |
| 2003/0182052 A1 | 9/2003 | DeLorme et al. | |
| 2004/0148101 A1 * | 7/2004 | Morita et al. | 701/211 |
| 2005/0037780 A1 | 2/2005 | Kuo et al. | |

FOREIGN PATENT DOCUMENTS

| | | | |
|---|---|---|---|
| CN | 1233376 A | 10/1999 | |
| CN | 1350414 A | 5/2002 | |
| CN | 1418036 A | 5/2003 | |
| JP | 8-136269 A | 5/1996 | |
| JP | 2001-167126 A | 6/2001 | |
| JP | 2002-135828 A | 5/2002 | |
| JP | 2002168647 A | 6/2002 | |
| JP | 2002225532 | 8/2002 | |
| JP | 2002-296047 A | 10/2002 | |
| JP | 2003-139842 A | 5/2003 | |
| JP | 2003-209598 A | 7/2003 | |
| JP | 2003-255242 A | 9/2003 | |
| JP | 2003255242 A | 9/2003 | |
| JP | 2004-296546 A | 10/2004 | |
| JP | 2004296546 A | 10/2004 | |
| KR | 2000-0022231 A | 4/2000 | |
| KR | 2003-0038494 A | 5/2003 | |
| WO | WO 97/50002 A1 | 12/1997 | |

OTHER PUBLICATIONS

Official Inquiry in Japanese Application No. 2006-548080, Appeal No. 2009-22627, mailed Mar. 30, 2010.
Decision of Rejection in Japanese Application No. 2006-548080, mailed Aug. 11, 2009.
Written Opinion in PCT Application No. PCT/CN2005/000051, mailed Apr. 14, 2005.
Information Disclosure Statement in U.S. Appl. No. 11/456,982, filed Jan. 12, 2009.
Information Disclosure Statement in U.S. Appl. No. 11/456,982, filed Jul. 9, 2007.
Information Disclosure Statement in U.S. Appl. No. 11/456,982, filed Jan. 17, 2007.
Appeal Decision in corresponding Japanese Application No. 2006-548080 (Jul. 5, 2011).

* cited by examiner

METHOD FOR OBTAINING DIRECTION OF TARGET LOCATION THROUGH A HANDSET

CROSS-REFERENCE TO THE RELATED APPLICATIONS

This application is a continuation of U.S. patent application Ser. No. 11/456,982, filed Jul. 12, 2006, which is a continuation of International Application No. PCT/CN2005/000051, filed Jan. 13, 2005, which claims the benefit of Chinese Patent Application Nos. 200410000964.2, filed Jan. 17, 2004, and 200410073713.7, filed Sep. 2, 2004, all four of which are hereby incorporated by reference in their entireties.

FIELD OF THE TECHNOLOGY

The present invention relates to handset technology, more particularly to a method for obtaining the direction of a target location through a handset.

BACKGROUND OF THE INVENTION

At present, handsets such as cell phone and Personal Digital Assistant (PDA) are more and more popular and have become people's indispensable tools to carry along. Accordingly, people are considering whether it is possible to configure more functions in the handset so that the handset can provide better services for users.

A scheme to equip the handset with a direction recognition function has been put forward, which is mainly to configure a digital compass module inside the handset to obtain geomagnetism direction data and configure a geomagnetism direction display module to convert the geomagnetism data into an image displaying data and display the image according to the image displaying data on a screen of the handset. According to this patent application, the handset is capable of distinguishing directions, in other words, a user can determine on a geomagnetism direction through this handset.

However, the user may not be satisfied with the geomagnetism direction determined by the handset. He may also want to further know the direction from his current location to a certain place. A typical example is: when exploring outside, the user needs to frequently acquire the direction from the current location to a target location. Islamic people need to frequently make pilgrimage in the direction of Mecca. It is very easy to distinguish the direction when it is clear or at a familiar place, but very difficult when it is cloudy or at an unfamiliar place. Although the compass can indicate the north direction for the user, it cannot tell the user the direction from the current location to Mecca.

So far, there is no scheme for determining the direction of a certain site through a handset for the user.

SUMMARY OF THE INVENTION

Therefore, the present invention provides a handset configured to implement a method for obtaining the direction of a target location, so that the user can acquire the direction of the location through the handset. The handset configured to implement the method includes the following steps: (1) the handset obtains geographical information of a current location and that of the target location, and figuring out a geographical meridian line of the current location; (2) the handset determines a direction from the current location to the target location according to the geographical information of the current location and that of the target location, and determines a first included angle between the direction from the current location to the target direction and the geographical meridian line of the current location, and then determines a second included angle of the geographical meridian line of the current location displayed on the screen of the handset; and (3) according to the first included angle and the second included angle, the handset figures out a display direction from the current location to the target location, and displays the display direction on the screen.

In the present invention, through the handset, the user can obtain geographical information of the current location and that of the target location, as well as obtain geographical meridian line of the current location, determine a first included angle between the direction from the current location and the target location and the geographical meridian line, determine a second included angle between geographical meridian line and the screen's vertical ordinate, determine a display angle between the direction of the current location to the target location and the screen's vertical ordinate according to the above-mentioned first and second included angles, and then display direction of the target location in terms of the current location according to the display angle, so that the user can conveniently confirm the direction of the target location in terms of current location through the handset at any time.

The scheme of the present invention can implement obtaining geographical information through GPS.

Furthermore, the scheme of the present invention can also preset relevant geographical information inside the handset or at the network side, for instance, presetting mapping relation between geographical identification and geographical information inside the handset and/or the network side, so that the handset can obtain corresponding geographical information according to geographical identification directly through the mapping relation stored in this handset or the network side, comparing with the process of adding a GPS module at the terminal, this process can satisfy low-side user's requirement as well as save equipment cost.

In the scheme of the present invention, the handset can determine the direction of a certain location from the current location by obtaining geographical information of the certain location, determining geographical meridian line corresponding to this location, direction of this geographical meridian line displayed on the screen and geographical information of the target location.

DETAILED DESCRIPTION OF THE EMBODIMENTS

Figure 1:
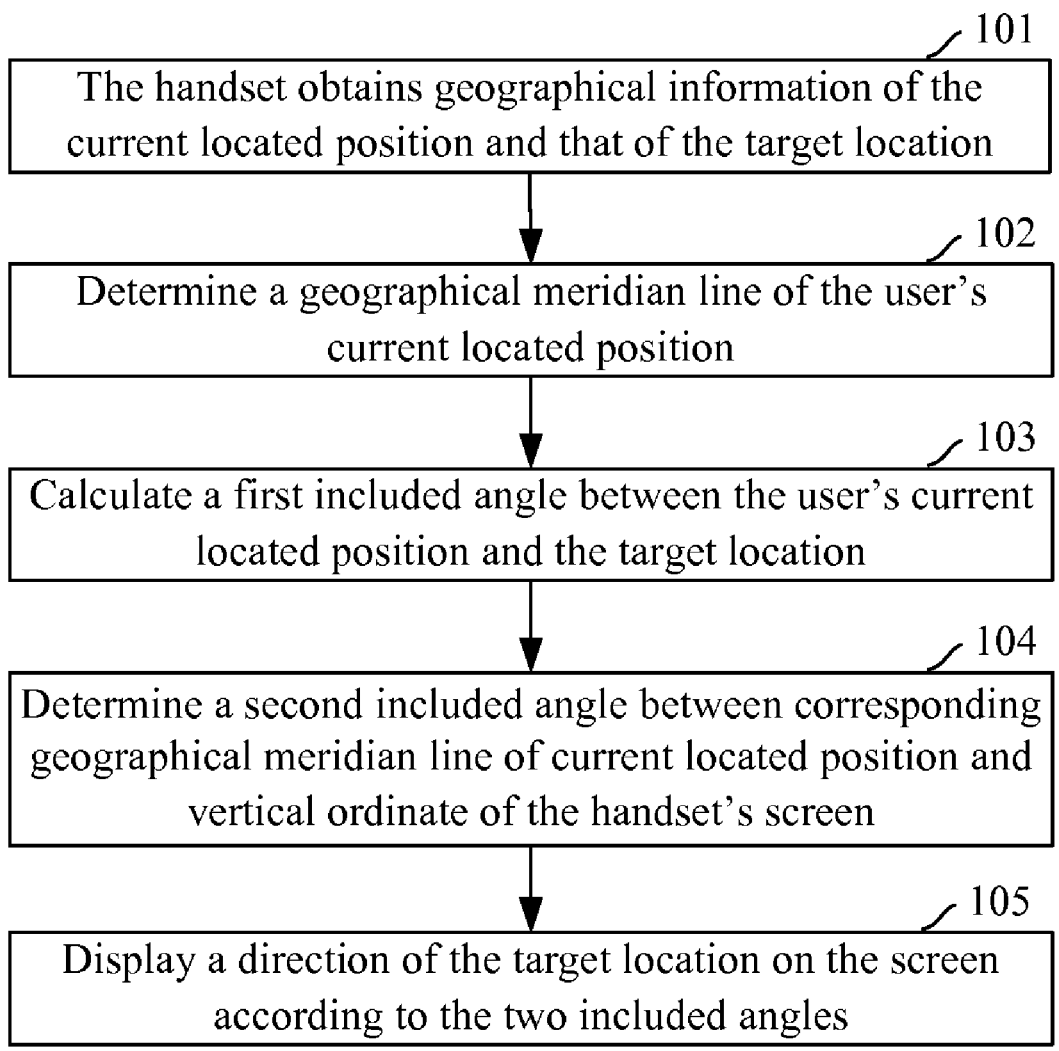
FIG. 1 is a flowchart of an embodiment according to the present invention.

According to an embodiment of the present invention, the method for obtaining the direction of the target location through a handset comprises the steps of determining a geographical meridian line of the current location, calculating a first included angle between the geographical meridian line and a circular art that takes the earth's core as the centre and goes through the current location and the target location, which can be also called the included angle between the geographical meridian line and the direction from the current location and the target location, and figuring out a second included angle between the geographical meridian line and a vertical ordinate of the handset screen, determining a display angle between the direction from the current location to a target location and the vertical ordinate of the handset screen according to the above-mentioned first and second included angles, and displaying the direction from the current location to the target location on the handset screen according to the display angle.

The present invention will be further illustrated in detail hereinafter with reference to accompanying drawings and specific embodiments.

With reference to FIG. 1, a preferred embodiment of the present invention includes the following steps:

Step 101: when the direction of a certain target location is needed, the user obtains geographical information of the current location and that of the target location through the handset.

The geographical information hereby should include geographical coordinate information (Gs), such as the longitude and the latitude of a location, so that the handset can perform a corresponding calculation accordingly.

The handset can obtain geographical information of the current location through GPS, for example, the handset can obtain geographical information of the current location through a GPS module configured inside the handset. As to mobile terminal equipment, the handset can obtain geographical information of the current location through a positioning function of the network side.

Since configuring a GPS module inside a handset will greatly increase the cost of the handset, an alternate choice is to establish a mapping relation table between geographical identifications and geographical coordinates inside the handset, so that the handset can find out a corresponding geographical coordinate to a geographical identification such as a structure's name or label, a street name, a park name and so on, according to the mapping relation table. The geographical identifications stored in the mapping relation table can also be relevant information of signal cells in a wireless communication system, for instance, the current location area or a cell label of the mobile terminal. In this way, while the handset is roaming, it can obtain the corresponding location area or cell label information and then obtain the corresponding geographical information from the mapping relation table according to the label information. Of course, if the handset can obtain an identifier of the access equipment in wireless communication system, such as the label of Access Point (AP) in Wireless Local Area Network (WLAN) or the information of Base Station (BTS) in wireless communication system, the label information can also be taken as the geographical identification information.

In practice, the mapping relation table of geographical information can be set for each city at the network side, wherein the table includes mapping relation between geographical identifications and geographical coordinates and can be called a mapping relation bank, so that the handset can obtain corresponding geographical coordinate information according to the geographical identification from the mapping relation bank at network side. Specifically, this procedure can include: the handset sends a short message including a geographical identification to network side equipment that stores the mapping relation bank, the network side equipment searches for the corresponding geographical coordinate in the stored mapping relation bank according to the geographical identification and sends the geographical coordinate information to the handset by a short message. The network side equipment can further add a command code to the short message to be sent to the handset, so that the handset can judge according to this command code whether the received short message carries the geographical coordinate information. Of course, the handset can also directly send a command to network side equipment that stores the mapping relation bank. The network side equipment determines the corresponding geographical identification information according to the current roaming information such as located area and cell, obtains the corresponding geographical information from the stored mapping relation bank according to the geographical identification information and takes this geographical information as that of the current location of the handset. The cost of the handset can be reduced through the above-illustrated process.

A special service command can also be set for the network side, so that the handset can obtain the corresponding geographical information from the network side by sending a service command that includes the geographical identification to the network side.

The user can also manually input a piece of geographical information to the handset. Of course, if the user knows the geographical information of the current location, the user can also input this geographical information in advance. This geographical information can also be transmitted by other users.

Geographical information of the target location obtained by the handset can be input by the user in advance or be transmitted by other users or be preset by the manufacturer of the handset. Similar to the procedure of obtaining the geographical information of the current location, mapping relations can be stored inside the handset or at the network side, so that the handset can obtain the corresponding geographical information by interacting with this mapping relation bank, for instance, by setting the mapping relation between Mecca and geographical location in the mapping relation bank at network side. The handset can obtain the corresponding geographical information according to the geographical name Mecca.

In addition, whether to obtain the geographical information of the current location or that of the target location, it is useful to store mapping relations between some frequently used geographical identifications and geographical information inside the handset. For instance, as to the current location, since the user's working place and living place are usually constant, the mapping relation between geographical information and relevant information of the handset such as resident cell and adjacent cells etc., can be set inside the handset. For example, the user's current living place and working place are usually in two different cells or in the same location area, the user can take these two different cells or this location as the resident cells. As to the target location, since the user usually needs to search for several target locations constantly, mapping relations between geographical information and these several target locations can be set inside the handset. Of course, mapping relations between geographical information and geographical identifications of all possible target locations can also be set at the network side. Based on such setting, while needing to acquire corresponding geographical information, the handset can judge if this geographical information is already stored inside this handset firstly, if this geographical information is not stored therein, the handset can then search for this geographical information at the network side. Through such setting, the handset is guaranteed to obtain relevant geographical information while maintaining less data information, so as to prevent accessing the network as much as possible and therefore save the accessing cost.

Step 102: the handset finds out the geographical meridian line of the current location of the handset.

The geographical meridian line of the handset's current location can be determined according to the location and geographical coordinate of the earth's two poles: firstly determining the circle whose center is the core of earth and that goes through the earth's two poles as well as the current location, and then taking the semicircle determined by the current location and the earth's two poles as the geographical meridian line of the current location of Gs.

Step 103: according to the handset's geographical information of the current location, geographical information of the target location and geographical meridian line of the current location, the handset determines the direction from the current location to the target location and figures out a first included angle, the first included angle is the included angle between the direction from the current location to the target location and the geographical meridian line.

While calculating the first included angle, it needs to determine the direction from the handset's current location to target location for the first place. Specifically speaking, according to geographical information of the handset's current location and that of the target location as well as according to coordinate information of the earth's core, a circular section on the earth is uniquely determined, therein the handset's current location and target location divide circumference of the circular section into two circular arcs, whose lengths can be calculated according to geographical coordinates of the handset's current location and that of target location, based on the shorter circular arc, the direction from the handset's current location to the target location along this shorter circular arc is taken as a positive direction of the target location in terms of the current location. Accordingly, the direction from the handset's current location to target location along the longer circular arc is taken as a negative direction of the target location in terms of the current location.

Of course, the positive direction and negative direction from the handset's current location to target location can also be obtained by other calculation methods.

Step 104: the handset determines a second included angle of the geographical meridian line of the current location displayed on the handset's screen.

Since the direction of the geographical meridian line can be considered the same as that of geomagnetism direction, the second included angle can be determined by calculating the included angle between the geomagnetism direction and the screen's vertical ordinate. Thus, according to the second included angle as well as the first included angle, the handset can determine a display angle between the screen's vertical ordinate and the direction from the current located direction to the target location.

Hereby, the separation between the geomagnetism direction and the screen's vertical ordinate can be figured out by setting a digital compass in the handset.

Step 105: according to the first included angle and the second included angle determined in step 103 and step 104, the handset obtains the display angle and displays the direction from the current location to the target location displayed on the screen on the screen according to the display angle.

Specifically speaking, according to the included angle between the geographical meridian line and the direction from the current located direction to the target location, as well as the included angle between the geographical meridian line and the screen's vertical ordinate, the handset determines the display angle between the screen's vertical ordinate and the direction from the current located direction to the target location. After that, the handset displays the direction according to the display angle between the screen's vertical ordinate and the direction from the current located direction to the target location.

While the handset is used for displaying the direction, a direction-indicating pointer can be preset in the handset, and the direction-indicating pointer can display the direction of the target location in terms of the current location by taking the screen's vertical ordinate as reference frame. For display convenience, a circle can also be set in the handset, fixed end of the pointer is located at the circle's center and the movable end directs to the circle's circumference. Meanwhile, four direction identifiers, namely the east, west, south and north, can also be set in the handset, and the four direction identifiers can be correspondingly displayed on this circle's circumference according to the above-mentioned second included angle between the screen's vertical ordinate and the direction of the geomagnetism. And then the direction of the target location can be indicated by the direction-indicating pointer, direction identifiers and circle thereof.

Besides, the current scheme of the present invention can further figure out the distance from current location of the handset to the target location so that the user can acquire more information. The distance can be in just the positive direction, while the distance in the negative direction can also be provided.

The above illustration is just a preferable embodiment of the present invention and is not used for confining or limiting the protection scope of the present invention.

The invention claimed is:

1. A handset configured to implement a method for obtaining a direction of a target location comprising:
   obtaining geographical information of a current location of the handset through a GPS module inside the handset or through a positioning function of a network side, and receiving geographical information of the target location transmitted by other handsets;
   determining a direction from the current location to the target location according to the geographical information of the current location and the geographical information of the target location; and
   determining a display angle between a vertical ordinate on a screen of the handset and the direction from the current location to the target location; and
   displaying the direction from the current location to the target location according to the display angle by taking the vertical ordinate on the screen as reference frame.

2. A mobile station configured to implement a method for obtaining a direction of a target location comprising:
   obtaining geographical information of a current location of the mobile station through a GPS module inside the mobile station or through a positioning function of a network side, and obtaining geographical information of the target location as a signal cell identifier, which identifies one of a network equipment, a location area and a cell label for a signal cell;
   determining a direction from the current location to the target location according to the geographical information of the current location and the geographical information of the target location;
   determining a display angle between a vertical ordinate on a screen of the mobile station and the direction from the current location to the target location; and
   displaying the direction from the current location to the target location according to the display angle by taking the vertical ordinate on the screen as reference frame;
   wherein obtaining the geographical information of the target location comprises:
   storing mapping relations between geographical identifications and geographical information inside the mobile station or at network side, and obtaining the geographical information of the target location from a geological geographical identification of the target location according to the mapping relations;

wherein the geographical information of the target location comprises geographical coordinate information of the target location.

3. The handset according to claim 2, wherein the geographical identification of the target location is a signal cell identifier of wireless communications, or a geographical name, or a structure name.

4. The handset according to claim 2, wherein the handset obtains the geographical information of the target location from the network side by way of short messages or service commands, and the network side stores the mapping relations between geographical identifications and geographical information.

5. A handset configured to implement a method for obtaining a direction of a target location comprising:

obtaining geographical information of a current location of the handset through a GPS module inside the handset or through a positioning function of a network side, and obtaining geographical information of the target location;

determining a direction from the current location to the target location according to the geographical information of the current location and the geographical information of the target location; and determining a display angle between a vertical ordinate on a screen of the handset and the direction from the current location to the target location; and displaying the direction from the current location to the target location according to the display angle by taking the vertical ordinate on the screen as reference frame;

wherein:

the handset stores a first group of mapping relations between the geographical identifications and the geographical information of the target location inside the handset;

the network side stores a second group of mapping relations between the geographical identifications and the geographical information of the target location at a network side; and according to a geographical identification of the target location, the handset judges whether corresponding geographical information for the geographical identification of the target location exists in the first group of mapping relations stored inside the handset itself; the corresponding geographical information is obtained from the first group of mapping relations stored inside the handset itself if the corresponding geographical information exists in the first group of mapping relations; otherwise, the corresponding geographical information is obtained from the second group of mapping relations stored at the network side;

wherein the handset further comprises:

the handset is a mobile station;

the geographical identification is a signal cell identifier; and the signal cell identifier identifies a network equipment or a location area or a cell label corresponding to a signal cell.

6. The handset according to claim 5, wherein the geographical identification is a signal cell identifier of wireless communications, or a geographical name, or a structure name.

7. The handset according to claim 5, wherein the handset obtains the corresponding geographical information from the network side by way of short messages or preset service commands.

8. The handset according to claim 1, wherein determining the direction from the current location to the target location according to the geographical information of the current location and the geographical information of the target location comprises:

uniquely determining a circumference upon the earth according to the geographical information of the current location and the geographical information of the target location as well as coordinate information of the earth's core;

determining a short circular arc along the circumference from the current location to the target location; and taking the direction along the short circular arc from the current location to the target location as the direction from current location to the target location.

9. The handset according to claim 1, wherein determining the display angle between the vertical ordinate on the screen of the handset and the direction from the current location the target location further comprises:

determining a geographical meridian line of the current location;

determining a first included angle between the direction and the geographical meridian line of the current location, and determining a second angle between the geographical meridian line of the current location and the vertical ordinate on a screen of the handset; and determining the display angle for the target location according to the first included angle and the second angle.

10. The handset according to claim 9, wherein determining the geographical meridian line of the current location comprises:

determining a circle that goes through both poles of the earth as well as the current location; and taking a semicircle of the circle as the geographical meridian line of the current location, semicircle of the circle going through both poles of the earth as well as the current location.

11. The handset according to claim 10, wherein:

a digital compass is pre-configured inside the handset; and determining the second angle comprises:

determining a second included angle between a geomagnetism direction of the earth and the a vertical ordinate of the screen as the second angle.

12. The handset according to claim 11, wherein:

a direction-indicating pointer is configured for displaying directions; and displaying the direction from the current location to the target location on the screen comprises:

taking the vertical ordinate of the screen as a reference frame, displaying the direction from the current location to the target location on the screen by the direction-indicating pointer.

13. The handset according to claim 11, wherein:

a direction identifier is used for displaying the geomagnetism direction.

\* \* \* \* \*